(12) United States Patent
Misu

(10) Patent No.: US 11,314,020 B2
(45) Date of Patent: Apr. 26, 2022

(54) METHOD FOR MANUFACTURING LENSED OPTICAL FIBER AND CUTTING DEVICE

(71) Applicant: TOYO SEIKAN GROUP HOLDINGS, LTD., Tokyo (JP)

(72) Inventor: Naoki Misu, Tokyo (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 17/008,415

(22) Filed: Aug. 31, 2020

(65) Prior Publication Data

US 2020/0393623 A1 Dec. 17, 2020

Related U.S. Application Data

(62) Division of application No. 16/620,281, filed as application No. PCT/JP2018/023103 on Jun. 18, 2018, now Pat. No. 11,092,749.

(30) Foreign Application Priority Data

Jun. 26, 2017 (JP) .............................. JP2017-124290

(51) Int. Cl.
*G02B 6/32* (2006.01)
*G02B 6/25* (2006.01)
(Continued)

(52) U.S. Cl.
CPC ................. *G02B 6/32* (2013.01); *G02B 6/25* (2013.01); *G02B 6/262* (2013.01); *G02B 6/4206* (2013.01)

(58) Field of Classification Search
CPC .................. G02B 6/2553; G02B 6/2555–2557
See application file for complete search history.

(56) References Cited

U.S. PATENT DOCUMENTS 3,910,677 A 10/1975 Becker et al.
4,049,414 A 9/1977 Smith
(Continued)

FOREIGN PATENT DOCUMENTS

CN 1611990 A 5/2005
CN 102667559 A 9/2012
(Continued)

OTHER PUBLICATIONS

Non Final Office Action dated Sep. 22, 2020 from the United States Patent and Trademark Office in related U.S. Appl. No. 16/620,281.
(Continued)

*Primary Examiner* — Rhonda S Peace
(74) *Attorney, Agent, or Firm* — Sughrue Mion, PLLC

(57) ABSTRACT

A cutting device that cuts, with a predetermined length, an elongated GRIN lens fused with an optical fiber with tips thereof abutting each other, the cutting device including: a fiber holder placing unit on which a fiber holder for holding the optical fiber is placed; a lens holder placing unit on which a lens holder for holding the GRIN lens is placed; and a cutting unit arranged between the fiber holder placing unit and the lens holder placing unit, wherein the fiber holder placing unit includes a positioning unit for positioning the fiber holder placed thereon, and the lens holder placing unit includes a positioning unit for positioning the lens holder placed thereon.

4 Claims, 3 Drawing Sheets

(51) Int. Cl.
*G02B 6/26* (2006.01)
*G02B 6/42* (2006.01)

(56) References Cited

U.S. PATENT DOCUMENTS

| | | | |
|---|---|---|---|
| 4,273,109 A | 6/1981 | Enderby | |
| 4,360,249 A | 11/1982 | Slemon | |
| 4,490,020 A | 12/1984 | Sakaguchi et al. | |
| 4,701,011 A | 10/1987 | Emkey et al. | |
| 4,962,988 A | 10/1990 | Swann | |
| 5,016,963 A | 5/1991 | Pan | |
| 5,095,519 A | 3/1992 | Dorsey | |
| 5,267,340 A | 11/1993 | Pan | |
| 5,384,874 A * | 1/1995 | Hirai | G02B 3/0087 385/34 |
| 6,014,483 A | 1/2000 | Thual et al. | |
| 6,827,507 B2 | 12/2004 | Chandan et al. | |
| 7,315,673 B2 | 1/2008 | Hata | |
| 7,400,799 B2 | 7/2008 | Koishi | |
| 8,834,036 B2 | 9/2014 | Aihara | |
| 9,229,170 B1 | 1/2016 | Wang et al. | |
| 9,268,090 B2 * | 2/2016 | Yokota | G02B 6/2555 |
| 9,377,583 B2 | 6/2016 | Giaretta et al. | |
| 9,977,189 B2 * | 5/2018 | Giaretta | G06T 7/12 |
| 2002/0130152 A1 * | 9/2002 | Cripps, Jr. | G02B 6/25 225/105 |
| 2003/0026539 A1 | 2/2003 | Kato | |
| 2003/0235372 A1 | 12/2003 | Schott et al. | |
| 2005/0147345 A1 | 7/2005 | Hata | |
| 2005/0183460 A1 | 8/2005 | Takahara | |
| 2006/0045419 A1 | 3/2006 | Matsumura et al. | |
| 2011/0316029 A1 | 12/2011 | Maruyama et al. | |
| 2012/0017644 A1 | 1/2012 | Fukuda | |
| 2012/0063720 A1 | 3/2012 | Wang et al. | |
| 2012/0243251 A1 | 9/2012 | Suzuki et al. | |
| 2013/0039621 A1 | 2/2013 | Aihara | |
| 2013/0205835 A1 | 8/2013 | Giaretta et al. | |
| 2014/0042647 A1 | 2/2014 | Isenhour et al. | |
| 2016/0202430 A1 | 7/2016 | De Jong et al. | |
| 2016/0327744 A1 * | 11/2016 | Giaretta | G06T 7/0008 |
| 2020/0103595 A1 | 4/2020 | Misu | |
| 2020/0393623 A1 * | 12/2020 | Misu | G02B 6/25 |

FOREIGN PATENT DOCUMENTS

| | | | |
|---|---|---|---|
| CN | 102859409 A | 1/2013 | |
| DE | 4112089 A1 * | 10/1992 | G02B 6/2551 |
| JP | 200159916 A | 3/2001 | |
| JP | 2003227963 A | 8/2003 | |
| JP | 2004347986 A | 12/2004 | |
| JP | 4037346 B2 | 1/2008 | |
| JP | 4659137 B1 | 3/2011 | |
| WO | 2004053547 A1 | 6/2004 | |

OTHER PUBLICATIONS

Extended European Search Report dated Jan. 25, 2021 in Application No. 18824329.9.
Final Office Action dated Feb. 17, 2021 in parent U.S. Appl. No. 16/620,281.
Notice of Allowance dated Apr. 28, 2021, from the United States Patent and Trademark Office in related U.S. Appl. No. 16/620,281.
International Search Report dated Sep. 4, 2018 from the International Bureau in application No. PCT/JP2018/023103.
International Preliminary Report on Patentability and Translation of the Written Opinion of the International Searching Authority dated Dec. 31, 2019 from the International Bureau in application No. PCT/JP2018/023103.
Communication dated Apr. 4, 2020, from the State Intellectual Property Office of the P.R.C in application No. 201880037895.2.

* cited by examiner

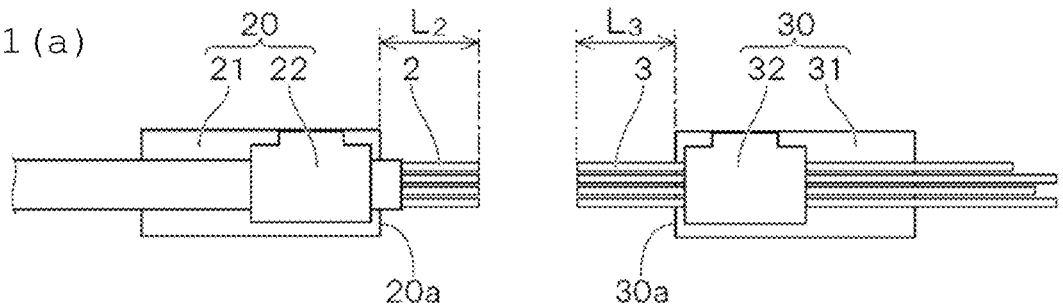
FIG. 1(a)
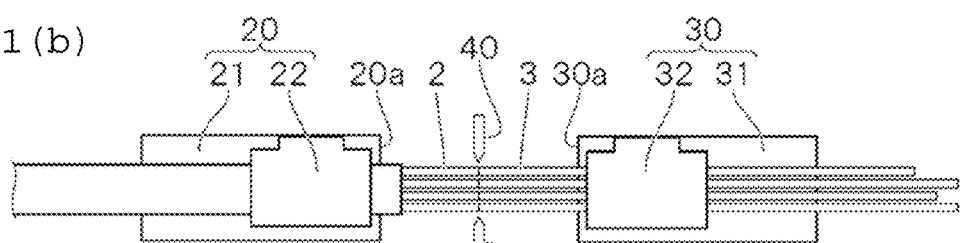
FIG. 1(b)
FIG. 1(c)
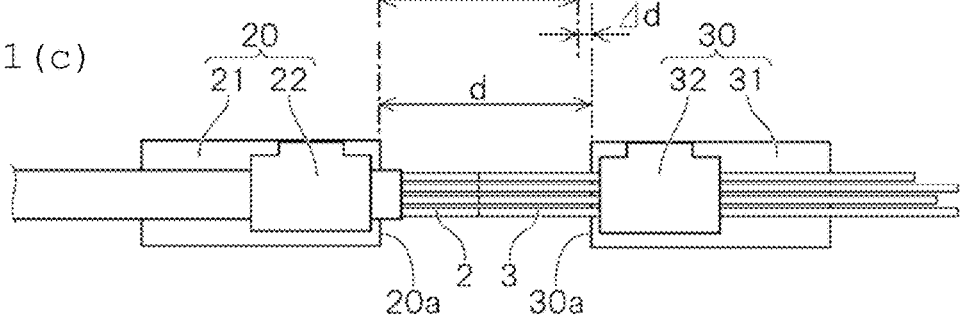
FIG. 1(d)
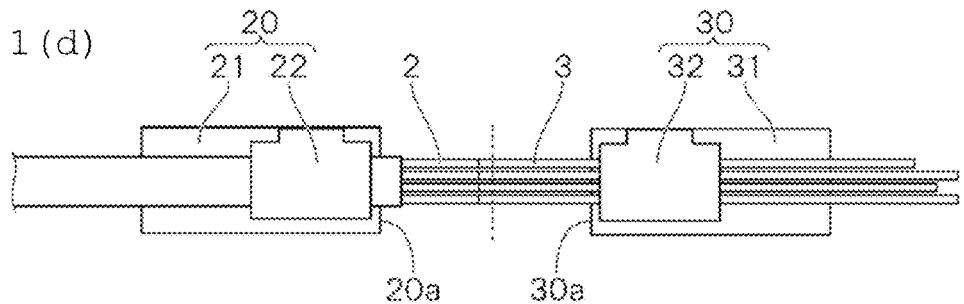
FIG. 1(e)
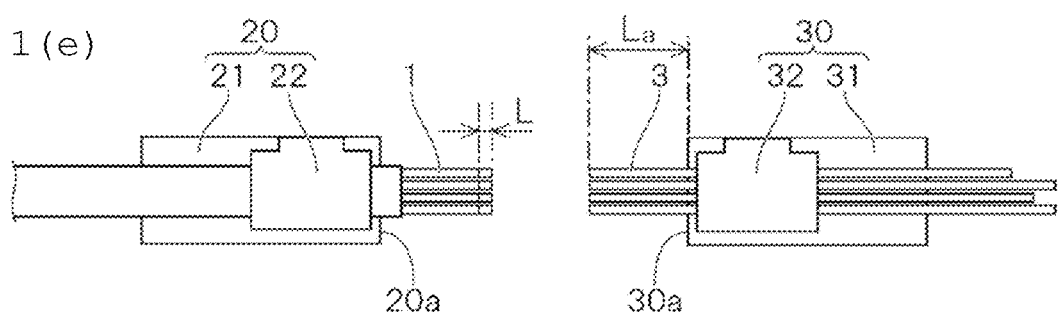

METHOD FOR MANUFACTURING LENSED OPTICAL FIBER AND CUTTING DEVICE

CROSS-REFERENCE TO RELATED APPLICATIONS

This application is a Rule 53(b) Divisional Application of U.S. application Ser. No. 16/620,281 filed Dec. 6, 2019, which is a National Stage of International Application No. PCT/JP2018/023103 filed Jun. 18, 2018, claiming priority based on Japanese Patent Application No. 2017-124290 filed Jun. 26, 2017, the disclosures of which are incorporated herein by reference in their respective entireties.

TECHNICAL FIELD

The present invention relates to a method for manufacturing a lensed optical fiber in which a rod-shaped GRIN lens is fused at a tip of an optical fiber, and a cutting device preferably used for the method.

BACKGROUND ART

Such an optical fiber is known as a lensed optical fiber in which a rod-shaped gradient index (GRIN) lens is fused at a tip of the optical fiber so that an optical fiber for transmitting an optical signal can be connected, with high efficiency and with low loss, with an optical device such as a semiconductor laser, an optical switch and an optical isolator (see Patent Documents 1 to 3).

In such a lensed optical fiber, in order to reduce transmission loss as much as possible, it is required that GRIN lenses evenly trimmed precisely with a predetermined length are fused at the tips of the optical fibers with high coaxiality. Patent Document 1 describes that optical fibers having tips evenly trimmed and elongated bodies of GRIN rod lenses (elongated rod lenses) having tips evenly trimmed are fused together with the tips thereof abutting each other, and then the elongated rod lenses are cut with a predetermined length, and according to such a method, lengths of the lenses can be aligned uniformly with high accuracy.

RELATED ART DOCUMENTS

Patent Documents

Patent Document 1: JP-A-2003-227963
Patent Document 2: JP-B-4037346
Patent Document 3: JP-B-4659137

SUMMARY OF THE INVENTION

Problems to be Solved by the Invention

A generally-known cutting device for an optical fiber is designed for evenly trimming tips of optical fibers, and has a structure in which cut-off portions are collected as fiber waste. If such a cutting device is used to perform the method described in Patent Document 1, as shown in FIG. 6(i) in Patent Document 1, upon cutting the elongated rod lenses fused with the optical fibers, while portions on an optical fiber side can be comparatively easily positioned by a clamping mechanism, a positioning adapter or the like, no means for regulating positions is provided on an elongated rod lens side, resulting in poor positioning accuracy.

Patent Document 1 describes that, according to the method in Patent Document 1, the lengths of the lenses are aligned uniformly with high accuracy. However, there is a limit thereto, and improvement in quality of a product and simultaneously improvement for enhancing a yield have been required.

It is not preferable in terms of cost to prepare new elongated rod lenses to evenly trim the tips and to fuse the trimmed ends with the optical fibers each time the elongated rod lenses are fused with the optical fibers because the elongated rod lenses are wastefully consumed. Therefore, it is also desired to use the elongated rod lens without waste to manufacture the lensed optical fiber with good productivity.

In view of the circumstances as described above, the present invention has been made, and an object of the present invention is to provide a method for manufacturing a lensed optical fiber in which a rod-shaped GRIN lens is fused at a tip of an optical fiber with good productivity and with high quality, and a cutting device preferably used for the method.

Means for Solving the Problems

A method for manufacturing a lensed optical fiber according to the present invention, in which a GRIN lens formed in an elongated shape is coaxially fused at a tip of an optical fiber, and then the GRIN lens is cut in a rod shape with a predetermined length, comprises a step of fusing together the optical fiber held in a fiber holder and the GRIN lens held in a lens holder with tips thereof abutting each other; a step of moving the lens holder in a direction away from the fiber holder, while relaxing holding force of the lens holder, and reholding the GRIN lens; and a step of cutting the GRIN lens with a length equal to a movement distance of the lens holder.

A cutting device according to the present invention relates to a cutting device that cuts, with a predetermined length, an elongated GRIN lens fused with an optical fiber with tips thereof abutting each other, in which the cutting device is formed into a configuration having: a fiber holder placing unit on which a fiber holder for holding the optical fiber is placed; a lens holder placing unit on which a lens holder for holding the GRIN lens is placed; and a cutting unit arranged between the fiber holder placing unit and the lens holder placing unit, wherein the fiber holder placing unit has a positioning means for positioning the fiber holder placed thereon, and the lens holder placing unit has a positioning means for positioning the lens holder placed thereon.

Advantageous Effects of the Invention

According to the present invention, a lensed optical fiber in which a rod-shaped GRIN lens is fused at a tip of an optical fiber can be manufactured with good productivity and with high quality.

BRIEF DESCRIPTION OF THE DRAWINGS

FIG. 1(a) to FIG. 1(e) are process diagrams schematically showing a method for manufacturing a lensed optical fiber according to an embodiment of the present invention.

MODE FOR CARRYING OUT THE INVENTION

Figure 2:
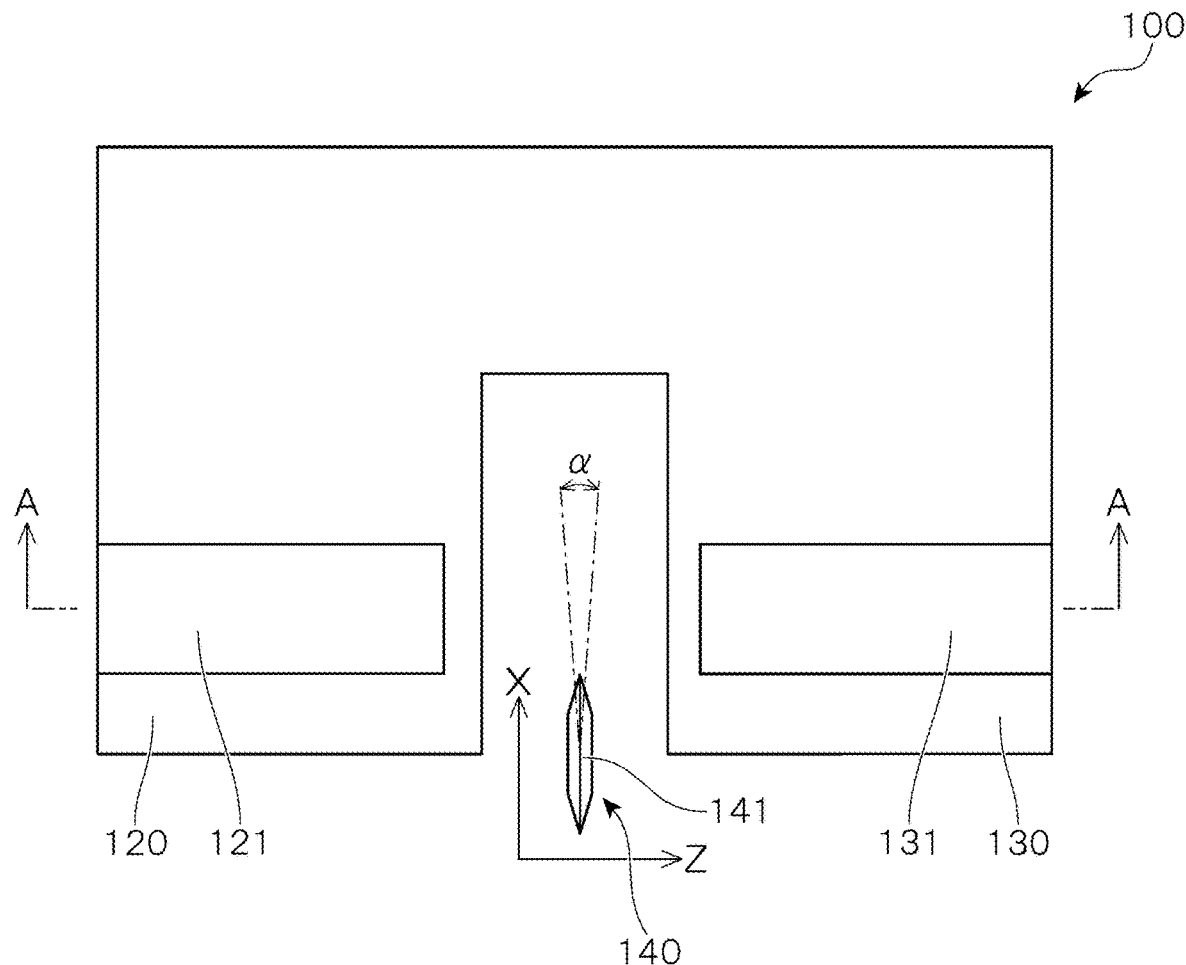
FIG. 2 is a plan view schematically showing a substantial portion of a cutting device according to an embodiment of the present invention.

Hereinafter, an embodiment of the present invention will be described with reference to drawings.

[Method for Manufacturing Lensed Optical Fiber]

First, an outline of a method for manufacturing a lensed optical fiber according to the present embodiment will be described.

FIG. 1(a) to FIG. 1(e) are process diagrams schematically showing a method for manufacturing a lensed optical fiber according to the present embodiment.

In the present embodiment, a GRIN lens 3 formed in an elongated shape is coaxially fused at a tip of an optical fiber 2, and then the GRIN lens 3 is cut in a rod shape with a predetermined length to manufacture a lensed optical fiber 1.

For coaxially fusing at the tip of the optical fiber 2 the GRIN lens 3 formed in the elongated shape, a publicly-known optical fiber fusion connection device can be used.

On the occasion, the optical fiber 2 and the GRIN lens 3 are held in a fiber holder 20 and a lens holder 30, respectively (see FIG. 1(a)). The optical fiber 2 and the GRIN lens 3 are set in the optical fiber fusion connection device with the tips thereof abutting each other. Abutting surfaces of both the tips positioned between a pair of discharge electrodes 40 are fused by arc discharge (see FIG. 1(b)).

Here, FIG. 1(a) to FIG. 1(e) show an example in which a 4-fiber ribbon is used, and a coating on a distal end side thereof is removed, and the GRIN lens 3 is fused with each of the optical fibers 2 of which ends are led, but the present invention is not limited thereto. When necessary, a multiple-fiber ribbon such as a 2-fiber ribbon, an 8-fiber ribbon and a 12-fiber ribbon may be used, and a single-fiber wire may be used.

The GRIN lenses 3 to be fused with the optical fibers 2 may include a gradient index lens having no cladding, a graded index (GI) optical fiber, or the like, and are not particularly limited, as long as a lens function is developed by a gradient index.

As the holders 20 and 30 for holding the optical fiber 2 and the GRIN lens 3, respectively, holders arranged according to a specification of the optical fiber fusion connection device may be used without modification, but the holders can be appropriately modified and used, when necessary.

For example, in the example shown in FIG. 1(a) to FIG. 1(e), as the lens holder 30 for holding the GRIN lens 3, such a holder can be used as a holder modified so that a plurality (4 in the example illustrated) of the GRIN lenses 3 can be coaxially positioned with the optical fibers 2 to be abutted, respectively, in which holding grooves formed in a V-shaped cross-section, an open box-shaped cross-section or the like are arranged in parallel at an appropriate interval and depth on an upper surface of a substrate 31 thereof.

In the example shown in FIG. 1(a) to FIG. 1(e), the lens holder 30 has the substrate 31, and a holding plate 32 attached to the substrate 31 to be pivotally with one end as an axis, and the lens holder 30 is configured so as to press and hold the GRIN lenses 3 between the substrate 31 and the holding plate 32. In a similar manner, the fiber holder 20 for holding the optical fibers 2 has a substrate 21, and a holding plate 22 attached to the substrate 21 to be pivotally with one end as an axis, and the fiber holder 20 is configured so as to press and hold the optical fibers 2 (jacketed optical fibers) between the substrate 21 and the holding plate 22.

The holders 20 and 30 also function as a positioning member for positioning the abutting surfaces of the optical fibers 2 and the GRIN lenses 3. End surfaces 20a and 30a of the holders 20 and 30 facing each other when the holders 20 and 30 are set in the optical fiber fusion connection device are applied as a positioning surface. When the holders 20 and 30 are set in the optical fiber fusion connection device so that the end surfaces 20a and 30a may face each other at a predetermined separation distance do, the holders 20 and 30 are configured so that the abutting surfaces of the optical fibers 2 and the GRIN lenses 3 are positioned between the pair of discharge electrodes 40 (see FIG. 1(b)).

Upon holding the optical fibers 2 and the GRIN lenses 3 in the fiber holder 20 and the lens holder 30, respectively, a length $L_2$ from the end surface 20a of the fiber holder 20 to the tips of the optical fibers 2, and a length $L_3$ from the end surface 30a of the lens holder 30 to the tips of the GRIN lenses 3 are appropriately adjusted so that such positioning can be made (see FIG. 1(a) and FIG. 1(b)). At this time, when necessary, the tips of the optical fibers 2 and the GRIN lenses 3 are preferably evenly trimmed so that the respective abutting surfaces of the optical fibers 2 and the GRIN lenses 3 may be perpendicular to an optical axis.

Thus, the optical fibers 2 held in the fiber holder 20 and the GRIN lenses 3 held in the lens holder 30 are fused together with the tips thereof abutting each other, and then the holders 20 and 30 are removed from the optical fiber fusion connection device.

In removing the holders 20 and 30 from the optical fiber fusion connection device, a position in which the optical fibers 2 are held is prevented from changing for the fiber holder 20.

Meanwhile, the lens holder 30 is moved in a direction away from the fiber holder 20, while relaxing force to press the GRIN lenses 3 (holding force of the lens holder 30) by lifting the holding plate 32 from the upper surface of the substrate 31, or the like for the lens holder 30. At this time, since the GRIN lenses 3 have been fused with the optical fibers 2, the lens holder 30 can be moved without loosening the GRIN lenses 3 to drop.

Figure 5:
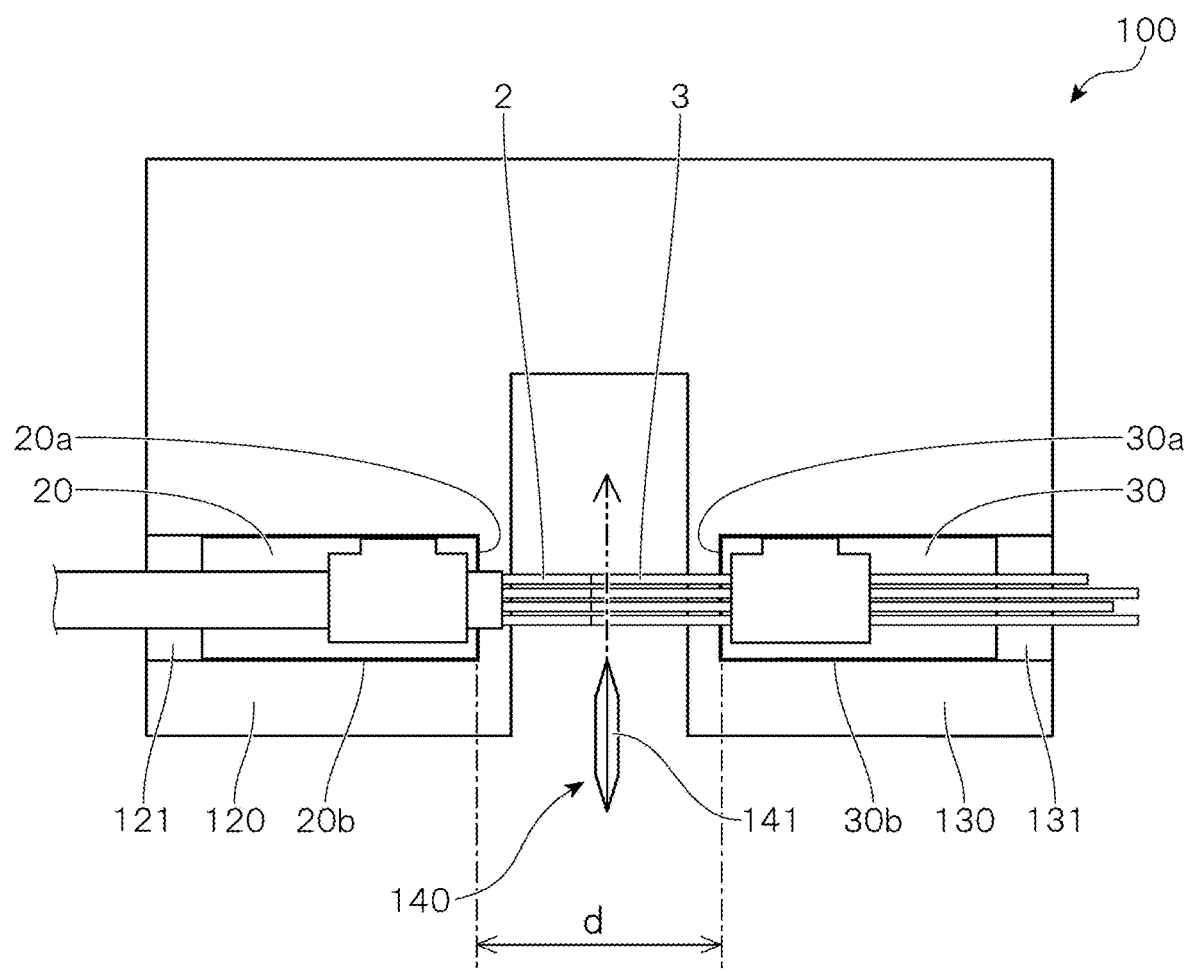
FIG. 5 is an explanatory diagram showing a use example of a cutting device according to the embodiment of the present invention.

Then, the holders 20 and 30 are set in the cutting device, while reholding the GRIN lenses 3 so that the end surface 20a of the fiber holder 20 and the end surface 30a of the lens holder 30 may face each other at a predetermined separation distance d ($=d_0+\Delta d$) (see FIG. 1(c) and FIG. 5).

The cutting device preferable for use in the present embodiment will be described later.

Then, the GRIN lenses 3 are cut in a rod shape in a position shown by a dotted line in FIG. 1(d), whereby the lensed optical fiber 1 can be obtained (see FIG. 1(e)).

In cutting the GRIN lenses 3, a length L from a position fused with the optical fibers 2 to a cutting position is appropriately adjusted so that the GRIN lenses 3 may be cut with a length at which an operating distance or a beam waist diameter satisfies a desired value, according to the gradient index of the GRIN lenses 3, a numerical aperture or the like. Then, a movement distance $\Delta d$ of the lens holder 30 upon reholding the GRIN lenses 3 as described above is set to be equal to the length L ($\Delta d = L$), whereby the GRIN lenses 3 are cut perpendicularly to the optical axis thereof with a length equal to the movement distance $\Delta d$ of the lens holder 30.

Thus, in the remaining GRIN lenses 3 held in the lens holder 30 after cutting, a length $L_a$ from the end surface 30a of the lens holder 30 to the tips thereof (see FIG. 1(e)) becomes equal to a length $L_3$ which is the length from the end surface 30a of the lens holder 30 to the tips thereof when the GRIN lenses 3 are first held in the lens holder 30 (see FIG. 1(a)). Accordingly, the GRIN lenses 3 are in a state in which positioning upon setting the optical fibers 2 and the GRIN lenses 3 in the optical fiber fusion connection device as described above can be made.

Therefore, the remaining GRIN lenses 3 after cutting are set again in the optical fiber fusion connection device while being held in the lens holder 30, and can be fused with a newly arranged optical fibers 2 with the tips thereof abutting each other.

As a result, according to the present embodiment, the above-described steps from fusing to cutting are repeatedly performed, whereby the lensed optical fiber 1 can be manufactured with good productivity by suppressing wasteful consumption of the GRIN lens 3.

Although not shown in particular, in the thus manufactured lensed optical fiber 1, another GRIN lens having a numerical aperture different from the numerical aperture of the GRIN lens 3 may be further fused with the GRIN lens 3 fused at the tip thereof (see Patent Document 2), or a prism lens may be further fused therewith to allow lateral emission (see Patent Document 3).

In the case of the former, for example, another GRIN lens having the numerical aperture different from the numerical aperture of the GRIN lens 3 is held in the lens holder 30, whereby the above-described steps from fusing to cutting may be performed on the lensed optical fiber 1.

In the case of the latter, for example, while a prism lens fiber is held in the lens holder 30 to perform the above-described steps from fusing to cutting on the lensed optical fiber 1, a distal end of the prism lens fiber cut with a predetermined length is polished or the like to form a distal end inclined surface to allow lateral emission.

[Cutting Device]

Next, a cutting device according to the present embodiment will be described.

Figure 3:
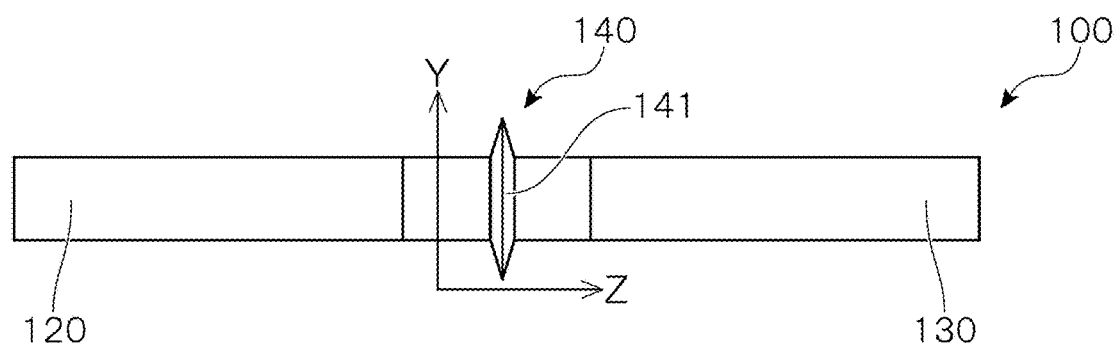
FIG. 3 is a front view schematically showing a substantial portion of a cutting device according to the embodiment of the present invention.
Figure 4:
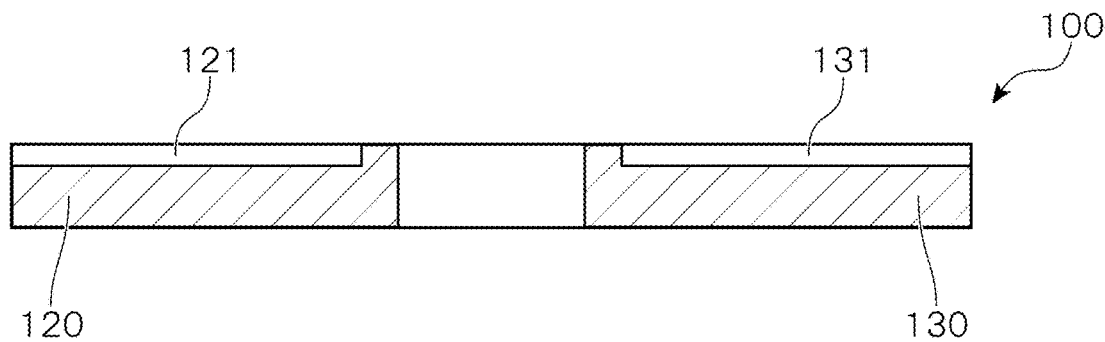
FIG. 4 is a cross-sectional view taken along A-A in FIG. 2.

FIG. 2 is a plan view schematically showing a substantial portion of a cutting device according to the present embodiment, FIG. 3 is a front view schematically showing the same, and FIG. 4 is a cross-sectional view taken along A-A in FIG. 2.

The cutting device according to the present embodiment can be preferably used upon cutting the GRIN lens 3 fused with the optical fiber 2 with the tips thereof abutting each other, with the predetermined length in the above-described method for manufacturing the lensed optical fiber. FIG. 5 shows a use example of the cutting device.

As shown in these drawings, a cutting device 100 has a fiber holder placing unit 120 on which the fiber holder 20 for holding the optical fiber 2 is placed, a lens holder placing unit 130 on which the lens holder 30 for holding the GRIN lens 3 is placed, and a cutting unit 140 arranged between the fiber holder placing unit 120 and the lens holder placing unit 130.

The cutting unit 140 has a cutting blade unit provided with a round blade-shaped cutting blade 141. As shown in FIG. 5, the cutting unit 140 can be formed into a configuration in which the cutting blade 141 slides in a direction perpendicular to the GRIN lens 3 to give a cut to the GRIN lens 3 in the cutting position thereof, and then stress is applied thereto to cleave the cutting position to cut the GRIN lens 3.

Although not shown in particular, the cutting unit 140 can also be formed into a configuration in which the cutting unit 140 has a clamping mechanism for gripping the GRIN lens 3 or the optical fiber 2 in the vicinity of both sides of the cutting position. As such a cutting unit 140, a cutting unit provided in a publicly-known cutting device used for cutting the optical fiber may be applied.

The fiber holder placing unit 120 has a positioning means for positioning the fiber holder 20 placed thereon, and the lens holder placing unit 130 has a positioning means for positioning the lens holder 30 placed thereon.

In the present embodiment, as such a positioning means, a positioning concave portion 121 for positioning the fiber holder 20 is engraved in the fiber holder placing unit 120 in abutting the end surface 20a and a side surface 20b of the fiber holder 20. In a similar manner, a positioning concave portion 131 for positioning the lens holder 30 is engraved in the lens holder placing unit 130 in abutting the end surface 30a and a side surface 30b of the lens holder 30.

These positioning concave portions 121 and 131 are engraved in such a manner that the positioning concave portions 121 and 131 extend in series, and respective longitudinal terminals are positioned on a side on which the cutting unit 140 is arranged. Thus, the respective longitudinal terminals are configured to touch the end surfaces 20a and 30a of the holders 20 and 30.

The positioning concave portions 121 and 131 are engraved in such a manner that the end surfaces 20a and 30a of the holders 20 and 30 face each other at the predetermined separation distance d (see FIG. 5). Thus, in the above-described method for manufacturing the lensed optical fiber, the movement distance Δd of the lens holder 30 can be easily regulated only by placing the end surface 30a of the lens holder 30 to the longitudinal terminal of the positioning concave portion 131 upon reholding the GRIN lens 3.

It should be noted that, when the length L at which the GRIN lens is cut is changed, a spacer having thickness corresponding thereto can be interposed in one or both of places between the longitudinal terminal of the positioning concave portion 121 and the end surface 20a of the fiber holder 20, and between the longitudinal terminal of the positioning concave portion 131 and the end surface 30a of the lens holder 30. Thus, the movement distance Δd of the lens holder 30 can be changed while maintaining a relationship: Δd=L, and also in the separation distance d between the end surfaces 20a and 30a of the holders 20 and 30, a relationship: $d=d_0+\Delta d$ can be maintained.

The fiber holder placing unit 120 and the lens holder placing unit 130 provided with such a positioning means may be configured by engraving the positioning concave portions 121 and 131 on different members, respectively, and these members including the units 120 and 130, respectively, may be configured to be combined. However, the units 120 and 130 formed in such a configuration requires alignment (level adjustment or the like). If the alignment of the placing units 120 and 130 is not sufficient, the optical fiber 2 and the GRIN lens 3 which are held in the holders 20 and 30 are inclined or the like, resulting in a risk of poor positioning accuracy.

In order to avoid such a defect, the fiber holder placing unit 120 and the lens holder placing unit 130 are preferably integrally formed so as to eliminate the need of alignment. For example, a metal plate or the like is used to apply cutting to one member, whereby the fiber holder placing unit 120 on which the positioning concave portion 121 is engraved, and the lens holder placing unit 130 on which the positioning concave portion 131 is engraved can be integrally formed. Thus, positioning accuracy can be further improved by eliminating the need of alignment of the fiber holder placing unit 120 with the lens holder placing unit 130.

In manufacturing the lensed optical fiber 1 by cutting the GRIN lens 3 fused with the optical fiber 2 with the tips thereof abutting each other, in order to improve quality thereof, and simultaneously enhance a yield, a cut surface thereof is required to be perpendicular to the optical axis without variations in the length L from the portion fused with the optical fiber 2 to the cutting position. In particular, in the above-described method for manufacturing the lensed optical fiber, upon fusing a plurality of the GRIN lenses 3 remaining after cutting with a plurality of newly arranged optical fibers 2 with the tips thereof abutting each other, presence of the variations in intervals of the end surfaces causes thickening or thinning of the portion fused therewith, and the like, for example, resulting in deterioration in the quality, the variations in the lens length, or causing a defect such as incapability of precisely assembling the resulting material into a ferrule or the like in several cases.

According to the present embodiment, such a defect can be resolved by improving the positioning accuracy of the holders 20 and 30. In order to further improve the quality and further improve the yield, a position of the cutting blade 141 is preferably set to be appropriately adjustable according to the number of the GRIN lenses 3 to be applied as a cutting target or the cutting position thereof, with a high degree of freedom.

For example, FIG. 2 and FIG. 3 show an X-axis, a Y-axis and a Z-axis of a three-dimensional orthogonal coordinate system. The cutting blade 141 is preferably adjusted to be movable in a Z-axis direction in which the cutting position of the GRIN lens 3 is adjusted, an X-axis direction perpendicular thereto, and simultaneously in a Y-axis direction in which depth of the cut given to the GRIN lens 3 is adjusted.

The GRIN lens 3 to be applied as the cutting target is inclined relative to the Z-axis depending on an individual difference of the holders 20 and 30, or the like in several cases. In consideration of such a case, a direction in which the cutting blade 141 slides in an XZ plane is preferably set to be adjustable to a predetermined angle α so that the direction in which the cutting blade 141 slides may be always perpendicular to the optical axis of the GRIN lens 3.

In order to allow such position adjustment, for example, the cutting blade unit of the cutting unit 140 can be supported on an XYZ rotating stage or the like. The cutting blade unit is supported on the XYZ rotating stage, whereby, upon adjusting the position of the cutting blade 141, position adjustment of an XYZ axis and angle adjustment in the XZ plane by a micrometer can be made.

As described above, the present invention is described by showing preferred embodiments, but the present invention is not limited to the embodiments described above, and various modifications can be obviously made within the scope of the present invention.

For example, in the above-described cutting device 100, the positioning means provided in the fiber holder placing unit 120 and the lens holder placing unit 130 may be a means for locking engaging pins vertically arranged on the placing units 120 and 130 in engagement holes drilled in the holders 20 and 30 to perform positioning thereof.

The entire contents of the documents described in the description concerning the present application and the description of the Japanese application serving as a basis of claiming the priority concerning the present application to the Paris Convention are incorporated by reference herein.

EXPLANATION OF NUMERICAL SYMBOLS

1 Lensed optical fiber
2 Optical fiber
3 GRIN lens
20 Fiber holder
20a End surface
20b Side surface
30 Lens holder
30a End surface
30b Side surface
100 Cutting device
120 Fiber holder placing unit
121 Positioning concave portion (positioning means)
130 Lens holder placing unit
131 Positioning concave portion (positioning means)
140 Cutting unit
141 Cutting blade (cutting blade unit)

What is claimed is:

1. A cutting device comprising:
   a fusion connection unit including:
      a first fiber holder placing member on which a fiber holder configured to hold an optical fiber is configured to be placed, the first fiber holder placing member being configured to set a position of the fiber holder;
      a first lens holder placing member on which a lens holder configured to hold an elongated GRIN lens is configured to be placed, the first lens holder placing member being configured to set a position of the lens holder so that a distance between the fiber holder and the lens holder is $d_0$; and
      an electrode arranged between the first fiber holder placing member and the first lens holder placing member and configured to fuse a tip of the optical fiber and a tip of the elongated GRIN lens, and
   a cutting unit including:
      a second fiber holder placing member on which the fiber holder configured to continue to hold the optical fiber is configured to be placed, the second fiber holder placing member being configured to set a position of the fiber holder;
      a second lens holder placing member on which the lens holder configured to rehold the fused elongated GRIN lens is configured to be placed, the second lens holder placing member being configured to set a position of the lens holder so that a distance between the fiber holder and the lens holder is $d_0+L$; and
      a cutter arranged between the second fiber holder placing member and the second lens holder placing member and configured to cut the GRIN lens of which the tip is fused with the tip of the optical fiber so that a length of the fused GRIN lens is L.

2. The cutting device according to claim 1, wherein,
   the second fiber holder placing member includes a first concave configured to hold an end surface and a side surface of the fiber holder to set the position of the fiber holder, and
   the second lens holder placing member includes a second concave configured to hold an end surface and a side surface of the lens holder to set the position of the lens holder.

3. The cutting device according to claim 2, wherein the first concave of the second fiber holder placing member and the second concave of the second lens holder placing member are formed on one member by cutting.

4. The cutting device according to claim 1, wherein the cutter includes a cutting blade and an XYZ rotating stage supporting the cutting blade.

* * * * *